(12) United States Patent
Bhardwaj et al.

(10) Patent No.: US 10,218,033 B1
(45) Date of Patent: Feb. 26, 2019

(54) BATTERIES AND ELECTROLYTES INCORPORATING FLUOROETHYLENE CARBONATE

(71) Applicant: Google LLC, Mountain View, CA (US)

(72) Inventors: Ramesh C. Bhardwaj, Fremont, CA (US); Tai Sup Hwang, Santa Clara, CA (US); Sujeet Kumar, Newark, CA (US); Bing Li, Union City, CA (US); Swapnil Dalavi, Atlanta, GA (US); Shabab Amiruddin, Menlo Park, CA (US)

(73) Assignee: Google LLC, Mountain View, CA (US)

( * ) Notice: Subject to any disclaimer, the term of this patent is extended or adjusted under 35 U.S.C. 154(b) by 579 days.

(21) Appl. No.: 14/927,922

(22) Filed: Oct. 30, 2015

Related U.S. Application Data

(60) Provisional application No. 62/222,483, filed on Sep. 23, 2015.

(51) Int. Cl.
| | |
|---|---|
| *H01M 10/0567* | (2010.01) |
| *H01M 10/0525* | (2010.01) |
| *H01M 10/0568* | (2010.01) |
| *H01M 10/0569* | (2010.01) |
| *H01M 10/0587* | (2010.01) |
| *H01M 4/525* | (2010.01) |
| *H01M 4/48* | (2010.01) |
| *H01M 4/02* | (2006.01) |

(52) U.S. Cl.
CPC ....... *H01M 10/0567* (2013.01); *H01M 4/483* (2013.01); *H01M 4/525* (2013.01); *H01M 10/0525* (2013.01); *H01M 10/0568* (2013.01); *H01M 10/0569* (2013.01); *H01M 10/0587* (2013.01); *H01M 2004/027* (2013.01); *H01M 2004/028* (2013.01)

(58) Field of Classification Search
CPC ......... H01M 10/0567; H01M 10/0568; H01M 10/0569; H01M 10/0587; H01M 10/0525; H01M 4/525; H01M 4/483; H01M 2004/027; H01M 2004/028
See application file for complete search history.

(56) References Cited

U.S. PATENT DOCUMENTS

| | | | |
|---|---|---|---|
| 8,951,672 B2 | 2/2015 | Hirose et al. | |
| 9,048,504 B2 | 6/2015 | Adachi et al. | |
| 2011/0111294 A1 | 5/2011 | Lopez et al. | |
| 2012/0105007 A1 | 5/2012 | Amiruddin et al. | |
| 2012/0295155 A1 | 11/2012 | Deng et al. | |
| 2012/0328915 A1* | 12/2012 | Hirose | H01M 10/0525 429/61 |
| 2013/0295439 A1 | 11/2013 | Masarapu et al. | |
| 2013/0323592 A1 | 12/2013 | Lee et al. | |
| 2014/0065464 A1 | 3/2014 | Masarapu et al. | |
| 2014/0138591 A1 | 5/2014 | Yoon et al. | |
| 2014/0370387 A1 | 12/2014 | Anguchamy et al. | |
| 2015/0050535 A1 | 2/2015 | Amiruddin et al. | |

FOREIGN PATENT DOCUMENTS

JP     2010-238665     * 10/2010

* cited by examiner

*Primary Examiner* — Laura Weiner
(74) *Attorney, Agent, or Firm* — McDonnell Boehnen Hulbert & Berghoff LLP

(57) ABSTRACT

This disclosure relates to a battery and a method for its manufacture. An example method includes forming an anode comprising silicon monoxide and a forming a cathode comprising lithium cobalt oxide. The method also includes arranging the anode, the cathode, and a separator in a layered arrangement. The method further includes winding the layered arrangement to form a wound arrangement, compressing the wound arrangement, and packing it into a pouch. The method yet further includes soaking the wound arrangement in an electrolyte for a predetermined time and at a predetermined temperature. The electrolyte includes a lithium hexafluorophosphate salt dissolved in a solvent including ethylene carbonate and diethylene carbonate in about a 1:2 volume ratio. The additive includes fluoroethylene carbonate in an 8-12% weight ratio.

8 Claims, 6 Drawing Sheets

BATTERIES AND ELECTROLYTES INCORPORATING FLUOROETHYLENE CARBONATE

CROSS-REFERENCE TO RELATED APPLICATIONS

This application is a nonprovisional of U.S. Provisional Patent Application Ser. No. 62/222,483 filed Sep. 23, 2015, the contents of which are hereby incorporated by reference.

BACKGROUND

Batteries that include lithium metal have a higher theoretical energy density as compared to other batteries that include alkaline or nickel-metal-hydride materials. However, lithium-containing batteries have not realized their full potential due to various challenges such as poor cycle performance and safety concerns. Accordingly, a need exists to reduce loss of Li-metal due to irreversible surface reactions during charge/discharge, reduce dendritic growth at the anode/current collector interface during charging, and reduce surface expansion/contraction due to non-uniform plating of lithium.

SUMMARY

Embodiments in the present disclosure relate to lithium-ion batteries and methods for their manufacture. In an example embodiment, a battery may include a silicon monoxide (SiO) anode, a lithium cobalt oxide (LCO) cathode, an electrolyte, and a separator. The electrolyte may include a lithium hexafluorophosphate ($LiPF_6$) salt dissolved in a solvent including ethylene carbonate (EC) and diethylene carbonate (DEC). The electrolyte also includes at least one additive, such as fluoroethylene carbonate (FEC). Incorporating FEC into the electrolyte may reduce battery cell swelling and improve battery cycle life.

In an aspect, a battery is provided. The battery includes an anode, a cathode, a separator, and an electrolyte. The anode includes silicon monoxide (SiO). The cathode includes lithium cobalt oxide (LCO). The separator includes an electrically-insulating material, and the electrolyte includes a salt dissolved in a solvent and at least one additive. The salt includes lithium hexafluorophosphate ($LiPF_6$). The solvent includes ethylene carbonate (EC) and diethylene carbonate (DEC) in about a 1:2 volume ratio. The additive includes fluoroethylene carbonate (FEC) in an 8-12% weight ratio.

In an aspect, a method of manufacturing a battery is provided. The method includes forming an anode. The anode includes silicon monoxide (SiO). The method also includes forming a cathode. The cathode includes lithium cobalt oxide (LCO). The method further includes providing a separator. The separator includes an electrically-insulating material. The anode, the cathode, and the separator are disposed in a layered arrangement. The method additionally includes winding the layered arrangement to form a wound arrangement and compressing the wound arrangement. The method yet further includes packing the wound arrangement in a pouch to form a packaged battery. The method also includes soaking at least the wound arrangement in an electrolyte for a predetermined soak time at a predetermined soak temperature. The electrolyte includes a salt dissolved in a solvent and at least one additive. The salt includes lithium hexafluorophosphate ($LiPF_6$). The solvent includes ethylene carbonate (EC) and diethylene carbonate (DEC) in about a 1:2 volume ratio. The additive includes fluoroethylene carbonate (FEC) in an 8-12% weight ratio.

Other aspects, embodiments, and implementations will become apparent to those of ordinary skill in the art by reading the following detailed description, with reference where appropriate to the accompanying drawings.

DETAILED DESCRIPTION

I. Overview

Figure 1:
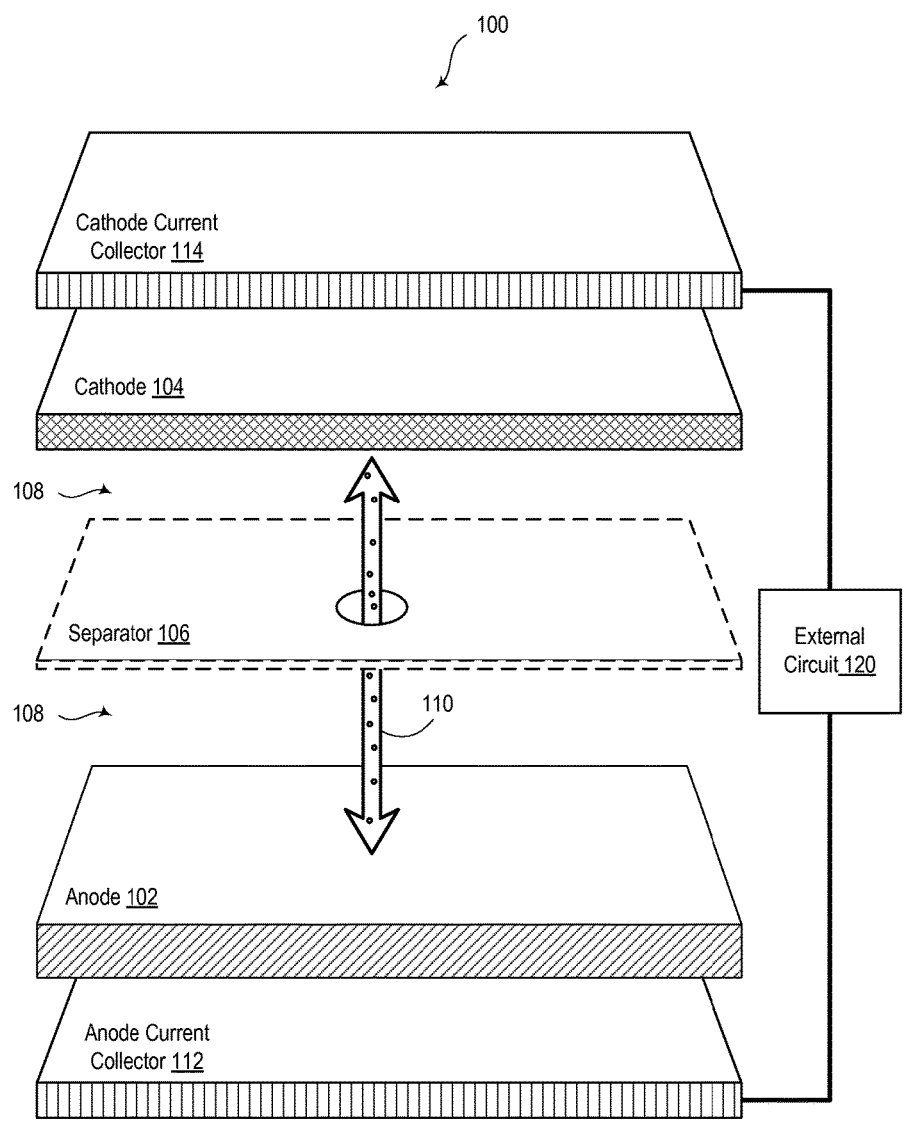
FIG. 1 illustrates a battery, according to an example embodiment.

The present disclosure relates to lithium-ion batteries and electrolytes thereof, and to a method of manufacturing such batteries. An example lithium-ion battery includes an anode, a cathode, and an electrolyte. The battery may include other elements, such as anode and cathode current collectors, which may be electrically coupled to the anode and cathode, respectively. In an example embodiment, the anode includes silicon monoxide (SiO) and the cathode includes lithium cobalt oxide (LCO). Specifically, the anode may include porous silicon monoxide configured to incorporate lithium metal. In some embodiments, the cathode may include nickel-manganese-cobalt (NMC). Other anode and cathode materials are contemplated.

The electrolyte includes a solution that incorporates a lithium salt dissolved in a solvent. In an example embodiment, a lithium hexafluorophosphate ($LiPF_6$) salt is dissolved in a solvent with a 1.2 molar concentration (mol/L). The solvent includes ethylene carbonate (EC) and diethyl carbonate (DEC) in about a 1:2 volume ratio.

In an example embodiment, the electrolyte further includes additives. The additives include propylene carbonate (PC, 6-9% by weight), propylsultone (PS, 3-4% by weight), and a fluorinated aromatic compound such as fluorobenzene (FB, 3-5% by weight) and/or fluoroethylene carbonate (FEC, 8-12% by weight). The electrolyte may optionally include the additive succinonitrile (SN, 2% by weight).

The battery described herein may include a solid electrolyte interphase (SEI) layer along an interface between the electrolyte and a surface of the anode. Namely, the SEI may form due to electrolyte decomposition at the interface during the first few charge/discharge cycles. Furthermore, the SEI may passivate the surface of the anode. The SEI may include lithium carbonate ($Li_2CO_3$), lithium oxide ($Li_2O$), and/or other materials that are permeable to Li ions.

In some embodiments, the battery may be formed in a jelly-roll configuration. Specifically, the anode, cathode, and a separator may be disposed in a layered arrangement. The layered arrangement may be wound so as to form the jelly-roll configuration. The jelly-roll configuration may be compressed under increased heat and packaged in a pouch-type cell. The pouch-type cell may be approximately 35 mm×20 mm×7.5 mm, however other sizes are possible. The pouch material may include an aluminized polypropylene. However, other pouch materials are possible.

A pouch thickness measurement may be conducted periodically after a cell formation procedure. The pouch thickness measurement may include measuring the thickness of the battery, including the pouch, using calipers. In an example embodiment, the pouch thickness increases less than 8% over a two week storage period.

The addition of FEC may help to provide a battery with an 80% capacity cycle life of over 300 charge cycles. The improvements in cycle stability may be attributed to a more robust SEI layer on the anode. As such, the addition of FEC may assist the formation of a more chemically stable SEI layer. Namely, electrolytes that include FEC may form very thin SEI layers that include lithium fluoride and polyethylene compounds. As such, the sheet resistance of the SEI layers may remain relatively low, even after repeated charge/discharge cycling. The batteries disclosed herein may improve other aspects of battery performance.

The batteries and manufacturing methods described herein may be applied to a variety of battery chemistries and battery types. For example, the battery may be a thin film-type battery or a jelly-roll-type battery. Furthermore, the anode may include lithium metal and the cathode may include lithium cobalt oxide ($LiCoO_2$ or LCO).

II. Example Batteries

FIG. 1 illustrates a battery 100, according to an example embodiment. The battery 100 may include an anode 102, a cathode 104, and a separator 106. In an example embodiment, the anode 102 may include silicon monoxide (SiO) or silicon. In other embodiments, the anode 102 may additionally or alternatively include lithium titanate ($Li_4Ti_5O_{12}$, or LTO) and/or an alloy of tin (e.g. $Cu_6Sn_5$) or cobalt (Co). The anode 102 may alternatively include carbonaceous materials such as hard carbon, soft carbon, graphite, or graphene. Some example embodiments may include nanoparticle forms of the anode materials described herein. Other materials are contemplated for the anode 102.

The cathode 104 may include a material such as lithium cobalt oxide ($LiCoO_2$, or LCO). Additionally or alternatively, the cathode 104 may include lithium manganese oxide ($LiMn_2O_4$, or LMO), lithium nickel manganese cobalt oxide ($LiNi_xMn_yCo_zO_2$, or NMC), or lithium iron phosphate ($LiFePO_4$, or LFP). Other cathode materials are possible. Furthermore, the cathode may be coated with aluminum oxide and/or another ceramic material, which may allow the battery to operate at higher voltages and/or provide other performance advantages.

In example embodiments, LCO and other cathode materials described herein may be deposited using various techniques such as RF sputtering or physical vapor deposition (PVD). However other deposition techniques may be used to form the cathode 104. The deposition of the cathode 104 may occur as a blanket over the entire substrate. A subtractive process of masking and etching may remove cathode material where unwanted. Additionally or alternatively, the deposition of the cathode 104 may be masked using a photolithography-defined resist mask.

The separator 106 may include a material configured to maintain a physical and electrical separation between the anode 102 and the cathode 104. The separator 106 may be a microporous membrane that is permeable to charge carriers (e.g. lithium ions) passing between the anode 102 and cathode 104. That is, the separator 106 may provide a physical barrier to prevent an electrical short while allowing reversible lithium ion transport between the anode 102 and the cathode 104.

In an example embodiment, the separator 106 may include one or more layers of a polymer-containing material (e.g. a polyolefin) such as polypropylene (PP), polyethylene (PE), or polymethylmethacrylate (PMMA), or a combination of such materials.

The electrolyte 108 of battery 100 may be arranged in and/or around the separator 106, and/or may be generally disposed between the anode 102 and the cathode 104. The electrolyte 108 may be configured to permit lithium ion conduction. Namely, electrolyte 108 may be configured to reversibly transport lithium ions via diffusion between the anode 102 and the cathode 104.

Further, the electrolyte 108 may take the form of or include a liquid electrolyte in a salt/solvent solution. The salt/solvent solution may include a lithium salt such as lithium hexafluorophosphate $LiPF_6$ or lithium tetrafluoroborate ($LiBF_4$).

The lithium salt may be dissolved in an organic solvent such as ethylene carbonate (EC), dimethyl carbonate (DMC), and/or diethyl carbonate (DEC). Other electrolyte materials are possible.

In an example electrolyte 108, a lithium salt may be incorporated or dissolved in the solvent with various molar concentrations. For example, $LiPF_6$ may be dissolved in the solvent according to a molar concentration between 1.1-1.3 (mol/L). In another example embodiment, the electrolyte 108 may include a solvent having a high-concentration of ether. In such a scenario, the electrolyte 108 may further include lithium bis(fluorosulfonyl)imide (LiFSI) as a lithium salt. Further, in some embodiments, the solvent may include EC and DEC in about a 1:2 volume ratio, however other volume ratios are possible. For example, the volume ratio of EC to DEC may vary within a range 1:1.8 to 1:2.2. Other lithium salts and/or solvents are possible.

The electrolyte 108 may also include one or more additives. For example, the electrolyte 108 may include fluoroethylene carbonate (FEC). In an example embodiment, FEC is incorporated into electrolyte 108 with a weight ratio within a range of 8-12%.

Other additives are possible. For example, additives incorporated into electrolyte 108 may include propylene carbonate (PC), propylsultone (PS), fluorobenzene (FB), lithium difluoro(oxalato)borate (LiFOB), and/or succinonitrile (SN). In some embodiments, PC may be added to electrolyte 108 with a 6-9% weight ratio. In such a scenario, PS may be incorporated into electrolyte 108 with a 3-4% weight ratio. Furthermore, FB may be incorporated into electrolyte 108 with a 3-5% weight ratio. SN may be incorporated into electrolyte 108 within a 1-3% weight ratio.

As described in embodiments herein, "weight ratio" is meant to describe a respective solute as a percent (by mass) of the total solution. For example, 5 grams of solute dissolved in 20 grams of solution would be equivalent to a 20% weight ratio.

Furthermore, as described herein, "volume ratio" is meant to describe a volume of a first component in proportion to a volume of a second component.

The battery 100 may additionally include an anode current collector 112 and/or a cathode current collector 114. In an example embodiment, the anode current collector 112 and the cathode current collector 114 may include one or more materials that function as electrical conductors. Furthermore, the anode current collector 112 and the cathode current collector 114 may be configured to be block lithium ions and various oxidation products ($H_2O$, $O_2$, $N_2$, etc.). In some embodiments, the anode current collector 112 and the cathode current collector 114 may include materials that have minimal reactivity with lithium. For example, the anode current collector 112 and/or the cathode current collector 114 may include one or more of: Au, Ag, Al, Cu, Co, Ni, Pd, Zn, and Pt. Alloys of such materials are also contemplated herein. In some embodiments, an adhesion layer material, such as Ti, may be included in the anode current collector 112 and/or the cathode current collector 114. In other words, the anode current collector 112 and/or the cathode current collector 114 may include multiple layers, e.g. TiPtAu. Other materials are possible to form the respective current collectors. For example, the anode current collector 112 and/or the cathode current collector 114 may be formed from carbon nanotubes and/or metal nanowires.

The anode current collector 112 and/or the cathode current collector 114 may be deposited using RF or DC sputtering of source targets. Alternatively, PVD, electron beam-induced deposition or focused ion beam deposition may be utilized to form the respective current collectors.

In an example embodiment, the anode current collector 112 and the cathode current collector 114 may be operable to be electrically coupled to an external circuit 120. That is, the battery 100 may generally provide power to the external circuit 120. In some cases, such as while charging battery 100, external circuit 120 may provide power to battery 100 so as to recharge it.

The external circuit 120 may include an electronic device, such as a computer, a laptop, a smartphone, a wearable device, a smartwatch, a tablet, an electric car, an electrical grid, or a mobile computing device. Generally, the external circuit 120 may include one or more devices that consume electrical power provided by the battery 100. Additionally, as described above, the external circuit 120 may include a charging device configured to recharge battery 100.

In some embodiments, the battery 100 may additionally include a substrate (not illustrated). In an example embodiment, the substrate may include a material suitable for roll-to-roll fabrication methods, such as metal foil or flexible plastic. Accordingly, the substrate may include a metal, such as copper (Cu), nickel (Ni), or an alloy thereof. Additionally or alternatively, the substrate may include polyethylene, polypropylene, or another polymer material. Other materials are contemplated.

The anode 102, the cathode 104, the separator 106 and, optionally, the anode current collector 112 and the cathode current collector 114, may be disposed in a layered arrangement. In other words, the anode 102, the cathode 104, the separator 106, etc., may be layered or stacked on one another. The layered arrangement may be wound so as to form a wound configuration, which may be termed a "jelly-roll". As an example, the layered arrangement may be wound into a substantially cylindrical shape as may be formed a roll-to-roll manufacturing method, such as the method illustrated and described in reference to method 200 and FIGS. 3A-3G. In some embodiments, the layered arrangement may be wound around a shaped form. Shaped forms may include a rectangular card, a cylinder, or another forms configured to provide a shape and/or structural support for the wound arrangement. Shaped forms may include an insulating polymeric material such as polyethylene.

In an example embodiment, the jelly-roll configuration may be inserted or otherwise packaged within a pouch. The pouch may include an aluminized polymer. The pouch may include electrical feedthroughs to provide electrical connections to the anode current collector 112 and the cathode current collector 114. In some embodiments, the pouch may include extra volume and material so as to accommodate gases that may be outgassed from the battery 100 during a cell formation process. In an example embodiment, the pouch may be pressure- and/or heat-sealed on one or more surfaces so as to enclose, package, and protect the battery 100.

As a result of outgassing during an initial cell formation process, a thickness of the pouch may expand. However, embodiments herein may be operable to limit pouch thickness expansion to less than or equal to 8% over a two week storage period subsequent to the initial cell formation cycle.

As a further result of the initial cell formation process and subsequent charge/discharge cycles, a solid electrolyte interphase (SEI) layer may form on one or both of the anode 102 and the cathode 104. The SEI layer may include at least one of lithium carbonate ($Li_2CO_3$) or lithium oxide ($Li_2O$). In such a scenario, the SEI layer may be electrically insulating while still configured to permit the transport of lithium ions through the SEI layer via diffusion.

Example embodiments described herein may provide a battery operable to retain an 80% capacity over at least 300 charge/discharge cycles. That is, a battery may have an initial charge capacity upon initial normal use. Such a battery may provide at least 300 charge/discharge cycles before its "fully charged" charge capacity falls below 80% of the initial charge capacity.

It should be understood that FIG. 1 illustrates the battery 100 in a "single cell" configuration and that other configurations are possible. For example, the battery 100 may be connected in a parallel and/or series configuration with similar or different batteries or circuits. In other words, several instances of battery 100 may be connected in series to in an effort to increase the open circuit voltage of the battery, for instance. Similarly, several instances of battery 100 may be connected in parallel to increase capacity (amp hours). In other embodiments, battery 100 may be connected in configurations involving other batteries. In an example embodiment, a plurality of instances of battery 100 may be configured in a planar array on the substrate. Battery 100 may also be arranged in a thin film-type configuration. Other arrangements and configurations are possible.

III. Example Methods

Figure 2:
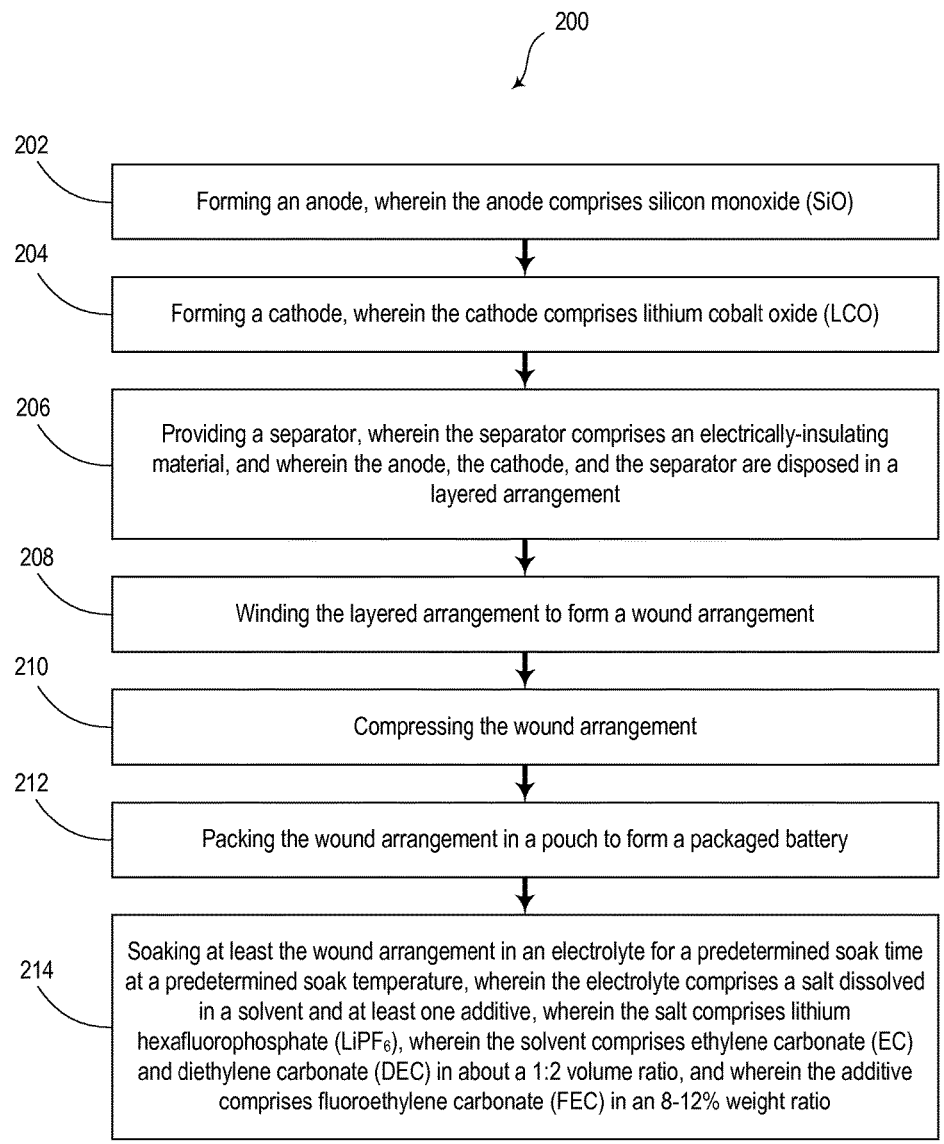
FIG. 2 illustrates a method, according to an example embodiment.

FIG. 2 illustrates a method 200, according to an example embodiment. The method 200 may include various blocks or steps. The blocks or steps may be carried out individually or in combination. The blocks or steps may be carried out in any order and/or in series or in parallel. Further, blocks or steps may be omitted or added to method 200.

The blocks of method 200 may be carried out to form or compose the elements of battery 100 as illustrated and described in reference to FIG. 1. Additionally or alternatively, method 200 may include some or all of the method of manufacture 300 illustrated and described in reference to FIGS. 3A-3G.

Block 202 includes forming an anode. The anode could be similar or identical to anode 102 as illustrated and described in reference to FIG. 1. The anode includes silicon monoxide (SiO). As described elsewhere herein, the anode may include additional or alternative materials.

In some embodiments, the method 200 may include incorporating lithium metal into the anode. In an example embodiment, a lithium metal may be introduced onto/into the anode in a pre-lithiation process. The pre-lithiation process may be provided in various ways. For example, lithium metal may be electroplated onto the anode via an electrochemical process. Namely, the anode may be immersed in a lithium-containing solution. In such a scenario, an electrical field may be created between the solution and the anode. Lithium metal may dissociate from the solution and become incorporated into the anode.

Alternatively or additionally, lithium metal may be evaporated onto the anode. For example, a lithium metal target may be a source for a RF sputtering, electron beam, thermal, or plasma-based evaporation system.

As another alternative, lithium metal may be deposited onto the anode via a stabilized lithium metal powder (SLMP). In an example embodiment, the SLMP may be sprayed or otherwise deposited onto the anode. Further processing steps, such as physical pressure and/or heating/sintering may be provided. Other ways of incorporating lithium metal into and/or onto a surface of the anode are contemplated herein.

In some embodiments, a pretreatment step may be provided before the incorporation of lithium into the anode. For example, the anode may be cleaned with an organic solvent and/or a wet chemical (e.g. HF) etch. Other surface preparation or cleaning processes are contemplated herein.

Block 204 includes forming a cathode. The cathode may be similar or identical to the cathode 104 as illustrated and described in reference to FIG. 1. In an example embodiment, the cathode may include lithium cobalt oxide (LCO); however other cathode materials are possible.

Block 206 includes providing a separator. The separator of method 200 may be similar or identical to separator 106 as illustrated and described in reference to FIG. 1. The separator includes an electrically-insulating material. In an example embodiment, the anode, cathode, and separator are disposed in a layered arrangement. In an example embodiment, the separator may be incorporated into the layered arrangement via a roll-to-roll processing system.

Block 208 includes winding the layered arrangement to form a wound arrangement. The wound arrangement may include wrapping or winding the layered arrangement into a substantially cylindrical shape so as to resemble a "jelly-roll" configuration. As an example, the wound arrangement may be formed by winding the layered arrangement several times around a spindle and/or a shaped form using a roll-to-roll processing system.

Block 210 includes compressing the wound arrangement. The compression could be performed by a pneumatic clamp. In such a scenario, the pneumatic clamp may be configured to compress the wound arrangement via one or more compressed gas cylinders or pistons. For example, the wound arrangement may be compressed with a predetermined pressure at a predetermined temperature for a predetermined time. In such a scenario, the wound arrangement may undergo a 130 kilogram force (kgf) at 70° C. for 3 minutes. In some embodiments, such a pressure or force may compress the wound arrangement into a substantially flat, rectangular shape. Other shapes are possible.

Block 212 includes packing the wound arrangement in a pouch to form a packaged battery. In an example embodiment, a robotic pick and place device may be configured to place the wound arrangement into an open pouch. In some embodiments, a thickness of the packaged battery may be approximately 8.0 mm, as measured between the major flats of the packaged battery.

Block 214 includes soaking the wound arrangement in an electrolyte for a predetermined soak time and a predetermined soak temperature. In an example embodiment, the wound arrangement may be soaked in the electrolyte for 2 hours at 40° C. While soaking, a temperature of the electrolyte and/or the wound arrangement may increase to approximately 50° C. Furthermore, while soaking, the thickness of the packaged battery may increase to about 10.0 mm.

The electrolyte may be similar or identical to electrolyte 108 as illustrated and described in reference to FIG. 1. Namely, the electrolyte may include a salt dissolved in a solvent and at least one additive. The salt includes lithium hexafluorophosphate ($LiPF_6$) and the solvent includes ethylene carbonate and diethylene carbonate in about a 1:2 volume ratio. In an example embodiment, the $LiPF_6$ is dissolved in the solvent with a molar concentration between 1.1-1.3 (mol/L).

The additive may include fluoroethylene carbonate (FEC) in a weight ratio that may range from 8-12%. Additionally or alternatively, the additive may include propylene carbonate (PC) in a 6-9% weight ratio, propylsultone (PS) in a 3-4% weight ratio, and fluorobenzene (FB) in a 3-5% weight ratio. In an example embodiment, the additive may additionally or alternatively include succinonitrile (SN) in a 1-3% weight ratio.

Optionally, the packaged battery may be clamped so as to maintain the thickness of the packaged battery between 7.8 to 8.8 mm. Under such conditions, the wound arrangement may be further soaked in the electrolyte for 46 hours at 40° C. Subsequent to such an electrolyte soaking step, the packaged battery may be clamped to between 7.3 to 7.5 mm. Other clamp thicknesses, soak times, and soak temperatures are possible.

An initial cell formation cycle may be carried out after the electrolyte soaking step(s). The initial cell formation cycle may include various charge, discharge, rest, and degas steps. Subsequent to the initial cell formation cycle, the thickness of the packaged battery may be measured periodically over a span of time. Namely, over a two week storage period, a thickness of the pouch between the major flats of the packaged battery may be measured. Embodiments herein may be operable to swell less than other battery designs. As such, the thickness of the pouch/packaged battery may be less than or equal to 8% over the two week storage period.

Due to the initial cell formation cycle and/or charge/discharge cycles, the battery may develop a solid electrolyte interphase (SEI) layer on the anode and/or the cathode. In such a scenario, the SEI layer may include lithium carbonate ($Li_2CO_3$) or lithium oxide ($Li_2O$).

FIGS. 3A-3G illustrate battery manufacturing scenario 300, according to an example embodiment. Battery manufacturing scenario 300 may include several steps or blocks that may be carried out in the order as illustrated. Alternatively, the steps or blocks may be carried out in a different order. Furthermore, steps or blocks may be added or subtracted within the scope of the present disclosure. Battery manufacturing scenario 300 may be similar or identical to method 200 as illustrated and described with regard to FIG. 2.

Figure 3A:
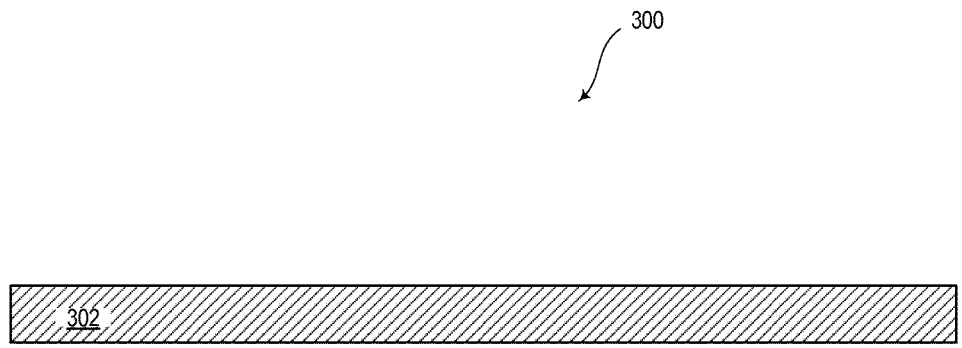
FIG. 3A illustrates a battery manufacturing scenario, according to an example embodiment.

FIG. 3A includes forming an anode 302. The anode 302 may be similar or identical to anode 102 as described in reference to FIG. 1. The anode 302 may include silicon monoxide (SiO).

Figure 3B:
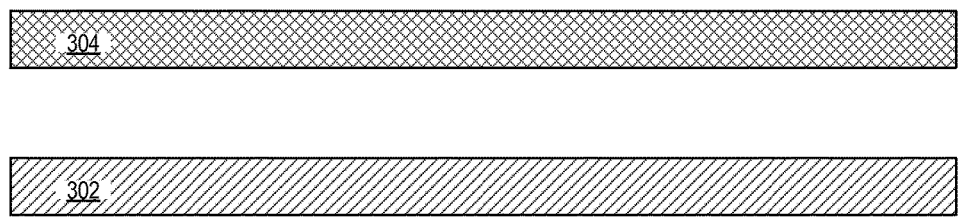
FIG. 3B illustrates a battery manufacturing scenario, according to an example embodiment.

FIG. 3B includes forming a cathode 304. The cathode 304 may be similar or identical to cathode 104 as illustrated and described in FIG. 1. The cathode 304 may include lithium cobalt oxide (LCO).

Figure 3C:
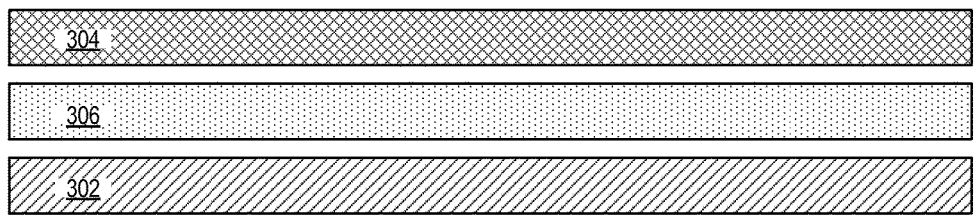
FIG. 3C illustrates a battery manufacturing scenario, according to an example embodiment.

FIG. 3C includes providing a separator 306. The separator 306 may be similar or identical to separator 106 as illustrated and described in reference to FIG. 1. In such a scenario, the separator 306 may include an electrically-insulating material. As shown in FIG. 3C, the anode 102, the cathode 104, and the separator 306 are disposed in a layered arrangement.

Figure 3D:
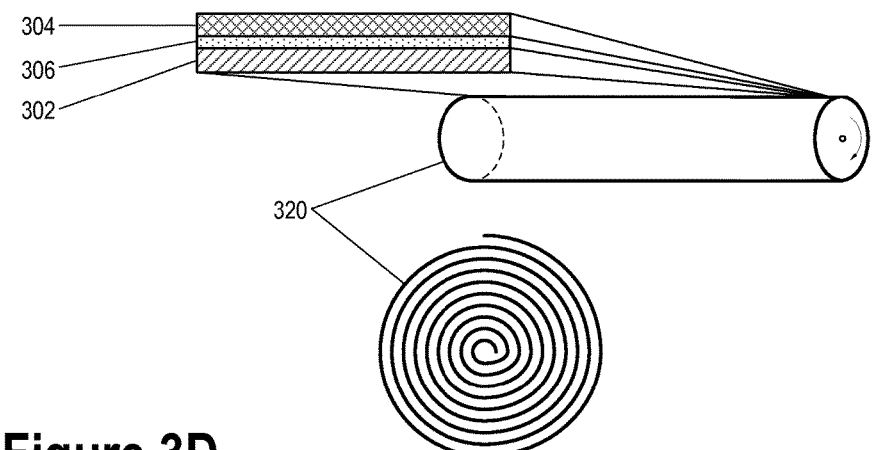
FIG. 3D illustrates a battery manufacturing scenario, according to an example embodiment.

FIG. 3D includes winding the layered arrangement so as to form a wound arrangement 320. For example, the layered arrangement may be wound around a spindle or a hub so as to form a substantially cylindrical "spiral" configuration. Such a configuration may be termed a "jelly roll" configuration. FIG. 3D illustrates oblique and cross-sectional views of the wound arrangement 320.

Figure 3E:
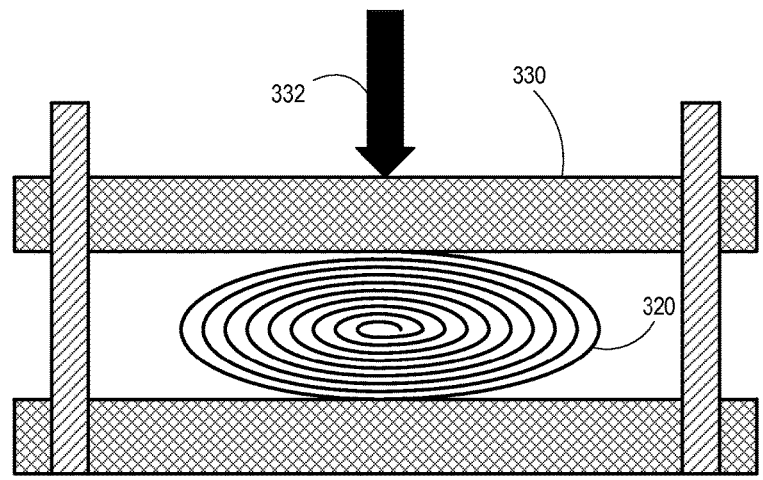
FIG. 3E illustrates a battery manufacturing scenario, according to an example embodiment.

FIG. 3E includes compressing the wound arrangement 320 with a clamp 330. Compressing the wound arrangement 320 may include providing a force 332. In an example embodiment, the force 332 on the wound arrangement 320 may be equal to 120 kgf. Optionally, additional heat may be provided (70° C.) for a specified time (3 minutes). As an example, clamp 330 may include two rigid plates and several alignment pins. As such, clamp 330 may be configured to apply a force 332 to the wound arrangement 320. The clamp 330 may include a pneumatic cylinder, gas piston, or another way to provide a physical force between the two rigid plates via gas pressure.

Figure 3F:
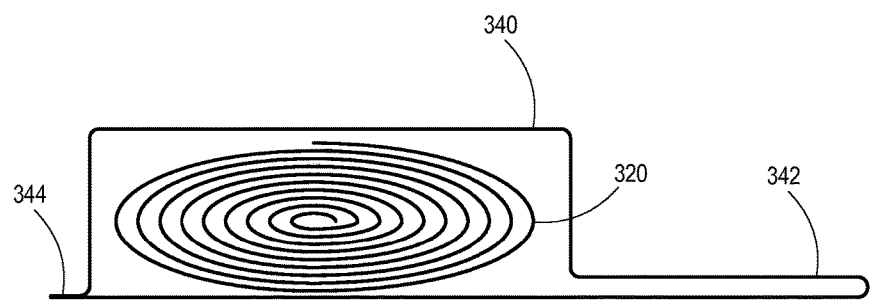
FIG. 3F illustrates a battery manufacturing scenario, according to an example embodiment.

FIG. 3F includes packing the wound arrangement 320 in a pouch 340 to form a packaged battery. The pouch 340 may include gas expansion volume 342 so as to provide for a way to remove outgassed products during initial cell formation. The pouch 340 may be sealed along at least one sealed edge 344 of the pouch 340. The gas expansion volume 342 may be configured to be sealed off from the rest of the pouch 340. At least initially, the pouch 340 may be configured to remain open so as to receive an electrolyte 350.

Figure 3G:
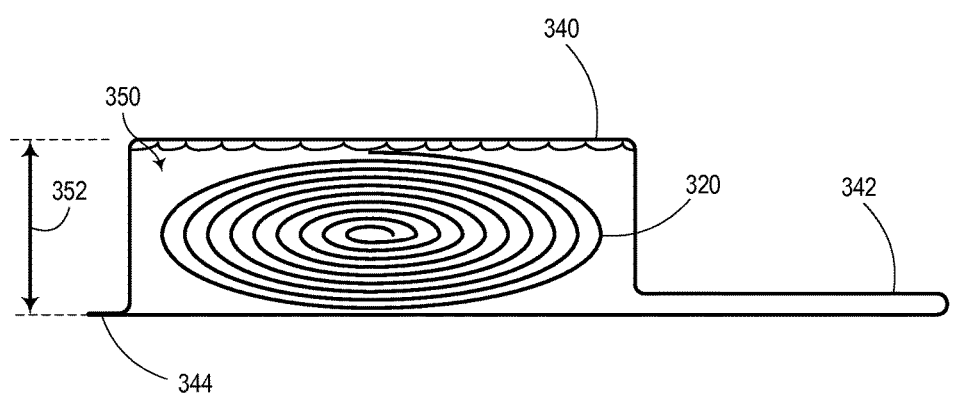
FIG. 3G illustrates a battery manufacturing scenario, according to an example embodiment.

FIG. 3G includes soaking the wound arrangement 320 in the electrolyte 350 for a predetermined soak time at a predetermined soak temperature. As described elsewhere herein, the electrolyte 350 includes a salt dissolved in a solvent and at least one additive. The salt includes lithium hexafluorophosphate (LiPF$_6$) and the solvent includes ethylene carbonate (EC) and diethylene carbonate (DEC) in about a 1:2 volume ratio. The additive includes fluoroethylene carbonate (FEC) in an 8-12% weight ratio. In an example embodiment, the predetermined soak time is 2 hours and the predetermined soak temperature is 40° C., although other soak times and soak temperatures are possible.

Optionally, the method 300 may include soaking the wound arrangement 320 in the electrolyte 350 for 46 hours at 40° C. Furthermore, subsequent to an initial cell formation cycle, a thickness of the pouch 352 does not increase more than 8% over a two week storage period.

In some embodiments, a solid electrolyte interphase (SEI) layer may be present on at least element of the wound arrangement 320. The SEI layer includes at least one of: lithium carbonate (Li$_2$CO$_3$) or lithium oxide (Li$_2$O).

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope and spirit being indicated by the following claims.

What is claimed is:

1. A battery comprising:
    an anode, wherein the anode comprises silicon monoxide (SiO);
    a cathode, wherein the cathode comprises lithium cobalt oxide (LCO);
    a separator, wherein the separator comprises an electrically-insulating material;
    a solid electrolyte interphase (SEI) layer, wherein the SEI layer comprises at least one of: lithium carbonate (Li$_2$CO$_3$) or lithium oxide (Li$_2$O); and
    an electrolyte, wherein the electrolyte comprises a salt dissolved in a solvent and at least one additive, wherein the salt comprises lithium hexafluorophosphate (LiPF$_6$), wherein the solvent comprises ethylene carbonate (EC) and diethylene carbonate (DEC) in about a 1:2 volume ratio, and wherein the additive comprises fluoroethylene carbonate (FEC) in an 8-12% weight ratio wherein the solid electrolyte interphase layer is between the electrolyte and a surface of the anode.

2. The battery of claim 1, wherein the lithium hexafluorophosphate (LiPF$_6$) is dissolved in the solvent with a 1.1-1.3 (mol/L) molar concentration.

3. The battery of claim 1, wherein the at least one additive further comprises at least one of: propylene carbonate (PC) in a 6-9% weight ratio, propylsultone (PS) in a 3-4% weight ratio, or fluorobenzene (FB) in a 3-5% weight ratio.

4. The battery of claim 1, wherein the additives further comprises succinonitrile (SN) in a 1-3% weight ratio.

5. The battery of claim 1, wherein the anode, the cathode, and the separator are disposed in a layered arrangement.

6. The battery of claim 5, wherein the layered arrangement is wound so as to form a jelly-roll configuration.

7. The battery of claim 6, wherein the jelly-roll configuration is packaged within a pouch.

8. The battery of claim 7, wherein, subsequent to an initial cell formation cycle, a thickness of the pouch does not increase more than 8% over a two week storage period.

* * * * *